Sept. 6, 1960   H. KROEPER ET AL   2,951,883
APPARATUS AND PROCESS FOR CARRYING OUT REACTIONS WHICH
PROCEED ENDOTHERMICALLY IN FLUIDIZED LAYERS
Filed Sept. 14, 1956
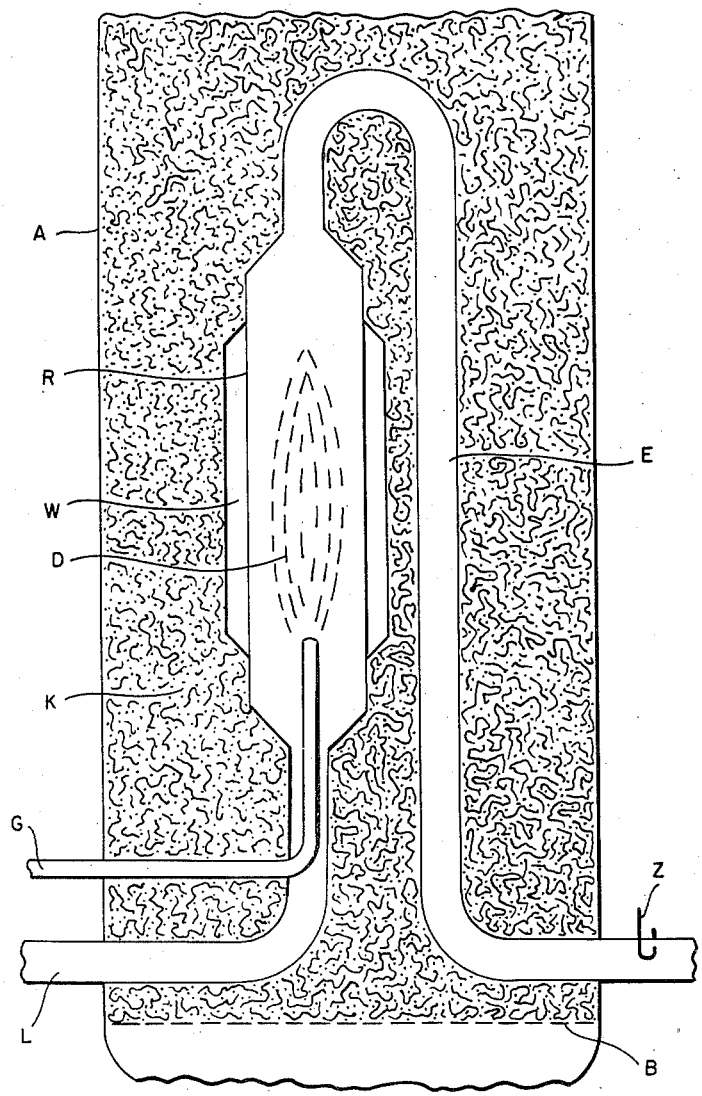
INVENTORS:
HUGO KROEPER
FRIEDRICH WIRTH
ROLF PLATZ
HANS FLOERCHINGER
BY
ATT'YS

2,951,883

APPARATUS AND PROCESS FOR CARRYING OUT REACTIONS WHICH PROCEED ENDOTHERMICALLY IN FLUIDIZED LAYERS

Hugo Kroeper, Heidelberg, Friedrich Wirth, Ludwigshafen (Rhine), Oggersheim, Rolf Platz, Mannheim, and Hans Floerchinger, Ludwigshafen (Rhine), Germany, assignors to Badische Anilin- & Soda-Fabrik Aktiengesellschaft, Ludwigshafen (Rhine), Rheinland-Pfalz, Germany Filed Sept. 14, 1956, Ser. No. 610,032

Claims priority, application Germany Sept. 22, 1955

4 Claims. (Cl. 260—668)

This invention relates to improvements in carrying out reactions which proceed endothermically in fluidized layers.

More specifically it relates to an improved process and an apparatus for carrying out reactions endothermically in fluidized layers.

Still more specifically it relates to an improved apparatus and process for carrying out reactions which proceed endothermically in fluidized layers in which the heat necessary for the reaction is generated in a new manner in the interior of the reaction zone.

It has already been proposed to carry out reactions in which besides gaseous or vaporous substances, there are also participating substances in the solid state, for example as reactants, catalysts or inert substances, by maintaining the solid substances in finely divided form in a moving, floating state by the introduced gaseous or vaporous substances. The solids may be in a state similar to a boiling liquid and carry out a fluidized motion or may be passed in this fluidized state through the reaction chamber with the gases. The necessary heat has hitherto been supplied to such reactions by directly burning gases or solids with air or oxygen-containing gases in the reaction chamber or by introducing heat from outside through the walls of the vessel. The indirect supply of heat through the walls of the reaction vessel offers difficulties or is quite impossible, especially in the case of vessels of large diameter and reactions which are strongly endothermic, because with increasing diameter of the vessel the volume of the reaction space increases to the third power whereas the heat-transferring surface increases only to the second power. Moreover no uniform temperature can be maintained in the entire fluidized layer in this way. The direct supply of heat by combustion in the fluidized layer has the disadvantage that waste of valuable substances occurs and additional combustion products are formed. Sometimes the presence of oxygen in the reaction chamber may be undesirable.

It has already been proposed to introduce the gaseous and/or solid substances into the reaction vessel in a preheated condition. By the preheating of gases or vapors, however, either it is only possible to introduce small amounts of heat into the reaction vessel because the specific heat of these substances is small, or the substances must be over-heated to such an extent that sometimes cracking or decomposition phenomena occur. When using preheated solids as heat carriers it is a disadvantage that by reason of the necessary circulation they suffer an increased attrition and frequently, in cases when the heat carriers are catalytically active at the same time, a falling off in their catalytic activity by the necessary heating.

We have now found that reactions which proceed endothermically can be carried out in fluidized layer processes in a simple way by using an apparatus comprising a reaction vessel provided in its interior with heating means including essentially a combustion chamber accommodated in the fluidized bed and heated internally by a diffusion flame.

Apparatus of this kind permits the whole of the internal space of the vessel to be heated uniformly and to be kept at any desired temperature, without any disturbance of the solid particles in fluidized movement taking place. As the reaction vessel there may be used for example a vertical cylindrical tube provided with a perforated plate at its bottom below which the inlet for the introduction of the gaseous substances is situated.

It is desirable to use as the heating generator a combustion chamber built into the fluidized bed and heated internally by means of a diffusion flame, i.e. to introduce heat into the chamber by indirect heating of the interior of the vessel, and this may be achieved for example in a specially preferred embodiment of the invention as illustrated in the single figure of the accompanying drawing.

By a diffusion flame we mean the flame produced by the combustion of a combustible gas with air if the gas to be burned burns in the interior of the air stream without previous mixing of the gas with the air. It will be understood, of course, that the term "air" is used herein in its broadest sense to include equivalent oxygen-containing or oxygen-enriched gases which can be employed to support combustion in a diffusion flame. The figure shows a reaction tube A in which above a partition plate B the fluidized solid particles K are situated and into which the tube R (the combustion chamber) for example of wrought iron or steel, or other refractory metallic or non-metallic material, is introduced. The combustion chamber R which traverses the whole reaction zone is tapered at the top and passes into a bent tube E, while at the bottom it merges into a tube L through which the air necessary for the diffusion flame is supplied. The small tube G which is passed through the walls of A and L, opens into the lower part of R serves for supplying the fuel gas. The ignition of the gas takes place outside the reaction vessel A in the tube E by means of a high voltage spark plug or hot bulb Z. For better conduction through the walls of the heat of the diffusion flame D produced in the combustion chamber, the outer walls of R are provided with heat conducting plates W which facilitate the transfer of heat to the reaction zone. If a combustion chamber R of for example 70 mm. diameter and 800 mm. length, which is made from stainless steel 3 mm. thick and which is provided on the outside with six heat-conducting plates of a width of 20 mm. is used the waste gas tube E having a diameter of 25 mm. and also being provided with three heat-conducting plates of 20 mm. width, there is introduced into the reaction zone the amount of heat of 13,500 kcals. per hour obtained by burning 4.5 cubic metres of hydrogen with air in a diffusion flame. By using a diffusion flame, temperature differences of not more than 50° C. result at the various points in the combustion chamber. The surface temperature of the combustion chamber is about 580° C. in free-flowing air.

Since the combustion chamber itself has no appreciable heat capacity, the temperature of the fluidized bed may readily be regulated automatically by control of the amounts of air and fuel gas.

As fuel gas there may be used, besides the hydrogen already described, other fuel gases, as for example producer gas, watergas, illuminating gas or natural gas. The temperature distribution within the combustion chamber is not changed by their use, but merely the amount of heat produced.

It was unexpected that in the entire fluidized bed a uniform distribution of heat could be produced by indirect heating of the reaction vessel, by introducing into the reaction vessel, in accordance with this invention, a combustion chamber and heating this with a diffusion flame. If instead of the diffusion flame, which only requires the amount of air theoretically necessary for the combustion, a thorough mixing of the fuel gas and air is carried out before combustion, there would be formed, with only a small excess of air, with the usual burners a very short and hot flame as a result of which a strong local overheating of the heat conveying wall would take place, whereas the use of a large excess of air would lead to a bad degree of efficiency of the heating device. Endothermic reactions which can be carried out by the fluidized bed method in the apparatus described are for example catalytic dehydrogenation of cycloalkyl hydrocarbons and their derivatives to unsaturated cycloalkyl hydrocarbons or aromatic hydrocarbons as well as terpenes, for example of dipentene to para-cymene, also isomerizations in the presence of catalysts, for example of n-butene to isobutene and delicate crackings of organic compounds for example di-iso-butene to iso-butene.

In the practice of endothermic processes, such as of reactions of the aforesaid type with the use of an apparatus as described, the solid catalyst having a grain size, for example of 0.05 to 0.5 millimeter, is fed into the apparatus in a finely divided form resting on the perforated bottom plate and forming a layer therein which is from a few centimeters to one meter or more thick. In order to prevent any small portions of catalyst particles from falling through the bottom plate, a second perforated plate may be fitted in such a manner that the perforations thereof are in a staggered relationship to those of the bottom plate fitted above. From underneath the bottom plate or plates the gaseous or vaporous materials to be reacted, either by themselves or together with inert gases, are fed into the apparatus or reactor in such an amount and at such a rate that the catalyst gets into a fluidized movement assuming a liquid-like appearance. The quantity of the gaseous or vaporous materials required quite naturally depends on the grain size of the catalyst and the dimensions of the reactor. With grain sizes of between 0.05 and 0.5 millimeter as aforesaid, the gaseous or vaporous materials should be fed in at a rate of from 0.1 to 0.6 meter per second with reference to the free cross-section. The heat-generating means provided to bring about the heat for the endothermic reaction are so arranged in the interior of the reactor that they are entirely surrounded by the catalyst. The catalysts used, for example, for dehydrogenation reactions can be of the type of the conventional hydrogenation catalysts, as for example platinum metals on carriers, such as silica gel, pumice, alumina and active carbon, and oxides of metals of the 3rd to 8th group of the periodic system or mixtures of the said metal oxides Especially good results are obtained with a mixed catalyst consisting of alumina and chromic oxide. This latter catalyst can also be used to special advantage for the dehydrogenation of dipentene to para-cymol and of butane or butene to butadiene. Further dehydrogenation reactions are, for example, those of ethylbenzene to styrene and of methylbutene to isoprene. The dehydrogenation temperatures are between 150° C. and 700° C. for the said materials. Examples of catalysts which are especially adapted for use in isomerization and cracking reactions are alumina containing chlorine, aluminum silicates and magnesium silicates. Suitable materials for isomerization reactions are, for example, n-butene and n-butane, while diisobutene, 1.1-dixylyl ethane and 1.1-ditolyl ethane are examples of materials which can be used for cracking reactions. The temperatures preferably used with the said type of endothermic reactions are between about 350° and 700° C. The temperatures can be regulated easily and uniformly over the whole reaction zone by the heat generators fitted in the reaction zone, without the occurrence of local overheating.

The carrying out of some of these endothermic reactions in the said apparatus will now be further described in the following example but the invention is not limited to this example.

*Example*

With reference to the figure dipentene is passed in vapor form, at boiling temperature through the catalyst feed of an upright tube, 200 millimeters in diameter and 3,000 millimeters in length, at a rate of 1 kilogram of dipentene per hour to each liter of catalyst the catalyst feed consisting in 40 liters of a mixture of chromic oxide and aluminum oxide with a grainsize of from 0.05 to 0.3 millimeter. The tube is provided with a perforated plate at its bottom end. Furthermore, the tube has a heat insulating casing on its outer side and, within its inner space, comprises a combustion chamber R of stainless steel, the said combustion chamber being 70 millimeters in diameter and 800 millimeters in length and carrying six heat conducting plates of 20 millimeters in width. The combustion chamber is wholly submerged in the catalyst bed kept in fluidized motion. Fed into the combustion chamber R through line G are 4.5 m.$^3$ of hydrogen per hour which are obtained by the dehydration of dipentene. Also fed into the combustion chamber are 12.4 m.$^3$ of air per hour through line L which comes up to an excess of 10%. The ignition of the hydrogen takes place outside the reactor at Z. Whereas the quantity of air is kept constant, the quantity of the gas is varied between 0.5 and 4.5 m.$^3$/h. by a regulating valve. The regulating valve receives its control pulse from a thermo-couple provided in the fluidized layer so that the quantity of hydrogen which flows into the combustion chamber is 4.5 m.$^3$/h. at temperatures below 470° C. and becomes smaller when the said temperature is exceeded. In this manner a constant temperature of 470° C. is maintained. The yields of p-cymol obtained by this method of operation are 93% with reference to the dipentene feed.

What we claim is:

1. In a process of carrying out an endothermic reaction in a fluidized layer of finely divided solid particles, the improvement which comprises supplying heat to support said endothermic reaction by introducing a combustible gas and air in separate streams into a combustion zone contained within and in indirect heat exchange with said fluidized layer and burning said combustible gas in the interior of the air stream to form a diffusion flame substantially throughout said combustion zone, whereby a substantially uniform heat of combustion is transferred substantially uniformly throughout said fluidized layer.

2. In a process of carrying out an endothermic reaction in a fluidized layer of finely divided solid particles, the improvement which comprises fluidizing said particles in an endothermic reaction zone surrounding a separate combustion zone in indirect heat transfer therewith, introducing an air stream into said combustion zone, introducing a combustible gas into said combustion zone at a point within said air stream without previous mixing of said air and said combustible gas, and burning said combustible gas in the interior of said air stream to form a diffusion flame substantially throughout said combustion zone, whereby a substantially uniform heat of combustion is transferred substantially uniformly throughout said reaction zone.

3. An improved process as defined in claim 2 wherein the fluidized solid particles have a grain size of about 0.05 to 0.5 millimeter.

4. In a process of carrying out an endothermic reaction between vaporous reactants in a fluidized layer of a finely divided catalyst, the improvement which comprises fluidizing said finely divided catalyst in an endothermic reaction zone at least partly by introduction of said vaporous reactants from below said reaction zone, introducing an air stream into a combustion zone surrounded by and in indirect heat exchange with said reaction zone, and introducing a combustible gas into said combustion zone at a point within said air stream without previous mixing of said air and said combustible gas, and igniting said combustible gas and burning the same in the interior of said air stream to form a diffusion flame substantially throughout said combustion zone, whereby a substantially uniform heat of combustion is transferred substantially uniformly throughout said reaction zone.

References Cited in the file of this patent

UNITED STATES PATENTS

| | | |
|---|---|---|
| 2,340,878 | Holt et al. | Feb. 8, 1944 |
| 2,376,308 | Dixon | May 15, 1945 |
| 2,408,600 | Berg | Oct. 1, 1946 |
| 2,432,934 | Rasor | Dec. 16, 1947 |
| 2,464,501 | Grahame | Mar. 15, 1949 |
| 2,533,945 | Legatski | Dec. 12, 1950 |
| 2,543,884 | Weikart | Mar. 6, 1951 |
| 2,698,171 | Schoenmakers et al. | Dec. 28, 1954 |
| 2,768,937 | Wigton | Oct. 30, 1956 |